Patented Aug. 10, 1937

2,089,353

UNITED STATES PATENT OFFICE 2,089,353

FLOWERPOT

Albert C. Fischer, Chicago, Ill.

No Drawing. Application February 21, 1935,
Serial No. 7,581

15 Claims. (Cl. 47—34)

This invention relates to improvements in flower pots in which the side of the pot is created out of roofing scrap. There is much available material on the market of a type of roofing known as prepared composition roofing in one, two and three plies. Much of this roofing has a gritty surface on one side and quite frequently in various colored grits. The waste material is available in sufficiently large sized pieces to enable one to manufacture various sized flower pots therefrom.

The invention accordingly consists in the features, combinations and arrangements of parts which will be exemplified in the construction hereinafter described or claimed for carrying out the above stated object and such other objects as will hereinafter appear in the description.

The base of the flower pot may be any suitable material, such as wood, plastic composition material, metal, or it may be fabricated from a heavy grade of the same material. The side pieces are adhesively adhered and riveted and the base may be attached thereto by any suitable means, such as, adhesion, tacking, binding with a hoop, or other suitable means.

In conjunction with this flower pot I may use a sponged rubber cushion base or suitable rubber sides placed on the inside of the pot, which will rest adjacent to the earthy material employed therein for the purpose of raising plants. This sponged material is prepared in the usual manner, preferably having very large pores, and is treated with a liquid fertilizer, the purpose being to retain in the pores of the sponged rubber as much fertilizer as possible, and dry the same therein, so that when the rootlets begin to grow they will receive the benefit of the fertilizer in these pores. Any suitable fertilizer may be utilized and the dry fertilizer may be spread into the pores as distinguished from liquid penetration. Likewise any other porous material besides sponged rubber may be employed for this purpose, such as, porous pottery, sponge, or any other suitable container.

It can readily be understood that flower pots can be made independently of the roofing material in conjunction with the fertilizer material and that the flower pots made out of roofing scrap can be used independently of this sponged rubber.

Any suitable fastening means on the edges of the roofing scrap may be utilized and adhesion be depended upon entirely without the bradding or stapling. Likewise it may be advisable to eliminate the adhesive material and depend entirely upon stapling or bradding.

While I have described embodiments in detail it will be understood that the detailed construction is for the purpose of illustration and not as a limitation of the invention, and that there may be various changes in detail without departing from the spirit of the invention.

I claim:

1. A flower pot having its side walls formed of prepared flexible sheet roofing material comprising a fibrous sheet saturated and coated with a bituminous material and having a gritty surface, said gritty surface being exposed outwardly on the pot for decorative purposes, and a sponged rubber inside the pot engaging an internal surface thereof.

2. A flower pot having its side walls fabricated from waste sheets of prepared flexible roofing material comprising a fibrous sheet saturated and coated with a bituminous material and having a gritty surface, said gritty surface being exposed outwardly on the pot for decorative purposes, and a sponged rubber inside the pot engaging an internal surface thereof.

3. A flower pot having its side walls fabricated from waste sheets of prepared flexible roofing material comprising a fibrous sheet saturated and coated with a bituminous material and having a gritty surface, said gritty surface being exposed outwardly on the pot for decorative purposes, and having a bottom of unlike material secured to said side walls, and a sponged rubber inside the pot engaging an internal surface thereof.

4. The method of making a flower pot having a decorative gritty surface which comprises shaping the side walls of the pot from waste sheets of prepared flexible roofing material comprising a fibrous sheet saturated and coated with a bituminous material and having a gritty surface, said gritty surface being exposed outwardly on the pot for decorative purposes, and securing a base thereto, and a sponged rubber inside the pot engaging an internal surface thereof.

5. The method of making a flower pot having a decorative gritty outside surface, which comprises forming a sheet of fibrous material saturated and coated with a bituminous material and having a gritty surface, cutting a piece of appropriate size from said sheet, forming the sides of the pot from said sheet with the gritty side outwardly exposed, and securing said sides to a rigid base member, and a sponged rubber inside the pot engaging an internal surface thereof.

6. A flower pot having its side walls fabricated from waste sheets of prepared flexible roofing material comprising a fibrous sheet saturated and coated with a bituminous material and having a gritty surface, said gritty surface being exposed outwardly in the pot for decorative purposes, and a rigid base secured to said sides and reinforcing them, and a sponged rubber inside the pot engaging an internal surface thereof.

7. A flower pot having a substantially non-elastic outer wall and a lining of porous sponged rubber having fertilizer in its pores.

8. A self-sustaining flower pot having its side walls formed of prepared flexible sheet roofing material comprising a relatively heavy fibrous sheet saturated and coated with a bituminous material and having a gritty surface comprising partially exposed particles, said gritty surface being exposed outwardly on the pot for decorative purposes.

9. A self-sustaining flower pot having its side walls fabricated from waste sheets of prepared flexible roofing material comprising a relatively heavy fibrous sheet saturated and coated with a bituminous material and having a gritty surface comprising partially exposed particles, said gritty surface being exposed outwardly on the pot for decorative purposes.

10. A self-sustaining flower pot having its side walls fabricated from waste sheets of prepared flexible roofing material comprising a relatively heavy fibrous sheet saturated and coated with a bituminous material and having a gritty surface comprising partially exposed particles, said gritty surface being exposed outwardly on the pot for decorative purposes, and having a bottom of unlike material secured to said side walls.

11. The method of making a self-sustaining flower pot having a decorative gritty surface which comprises shaping the side walls of the pot from waste sheets of prepared flexible roofing material comprising a relatively heavy fibrous sheet saturated and coated with a bituminous material and having a gritty surface comprising partially exposed particles, said gritty surface being exposed outwardly on the pot for decorative purposes, and securing a base thereto.

12. The method of making a self-sustaining flower pot having a decorative gritty outside surface, which comprises forming a sheet of relatively heavy fibrous material saturated and coated with a bituminous material and having a gritty surface comprising partially exposed particles, cutting a piece of appropriate size from said sheet, forming the sides of the pot from said sheet with the gritty side outwardly exposed, and securing said sides to a rigid base member.

13. A self-sustaining flower pot having its side walls fabricated from waste sheets of prepared flexible roofing material comprising a relatively heavy fibrous sheet saturated and coated with a bituminous material and having a gritty surface comprising partially exposed particles, said gritty surface being exposed outwardly in the pot for decorative purposes, and a rigid base secured to said sides and reinforcing them.

14. The method step in making a flower pot consisting in spreading dry fertilizer into the pores of sponged rubber.

15. The method step in fertilizing soil for plant growth consisting in spreading dry fertilizer into the pores of sponged rubber.

ALBERT C. FISCHER.